Figure 1:
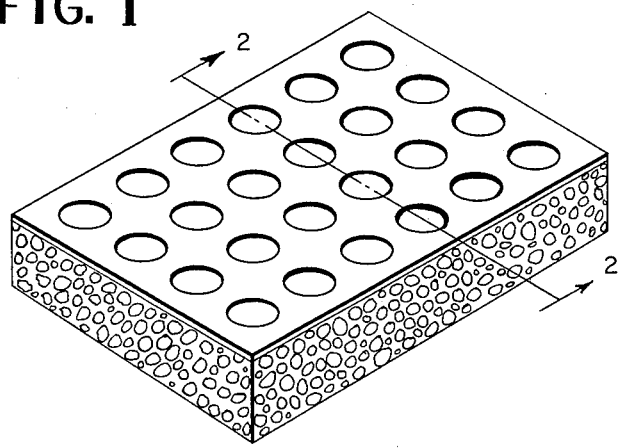
Figure 2:
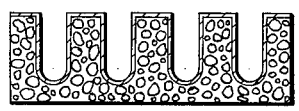

May 19, 1964   R. E. KNOX   3,133,853
RESILIENT COMPOSITE POLYURETHANE STRUCTURES
Filed Sept. 8, 1958

INVENTOR
ROGER E. KNOX

BY *Walter H. Steinbauer Jr.*

ATTORNEY

United States Patent Office 3,133,853
Patented May 19, 1964

3,133,853
RESILIENT COMPOSITE POLYURETHANE
STRUCTURES
Roger E. Knox, Claymont, Del., assignor to E. I. du Pont de Nemours and Company, Wilmington, Del., a corporation of Delaware
Filed Sept. 8, 1958, Ser. No. 759,448
2 Claims. (Cl. 161—119)

This invention is directed to resilient polyurethane foams having improved load-bearing characteristics. These foams find significant use in the formation and construction of mattresses, automobile seat cushions, and furniture upholstery.

Resilient polyurethane foams are being used for rug backing, crash pads, clothing innerliners, mattresses, upholstery, seat cushions, and the like; these foams display higher load-bearing capacity, better abrasion resistance, and, less flammability than does, for example, conventional latex rubber foam. However, such polyurethane foams are less comfortable to sit down on because they tend to give a sinking sensation. This shortcoming is evidenced by a plateau region in their compression deflection curve. Furthermore, when prepared at low densities where the cost per unit of volume is commercially attractive, polyurethane foams do not have as satisfactory load-bearing capacity for use in many applications such as automobile seat cushions, mattresses, and the like, as do conventional resilient articles containing, for example, mechanical springs.

Firmer support can be provided by using polyurethane foams of greater density; however, the increased cost is economically unattractive. Polyurethane foams can be made containing curled hair fillers; again the improvement obtained is not sufficient to justify the added expense.

It is, therefore, an object of the present invention to provide polyurethane foams having superior load-bearing characteristics at economically attractive low densities. It is a further object of this invention to provide resilient polyurethane articles having regions of varied increased load-bearing capacity similar in effect to incorporated mechanical springs. It is a still further object to provide improved polyurethane seat cushions. It is an additional object of the subject invention to provide polyurethane mattresses having improved load-bearing characteristics.

These and other objects will become apparent in the following description and claims.

More specifically, the present invention is directed to a cellular polyurethane structure having incorporated therewith a solid non-cellular polyurethane non-planar sub-structure essentially co-extensive with at least 75% one surface of said cellular polyurethane structure.

It has been found that the compression deflection properties of a resilient polyurethane foam may be improved remarkably by positioning a non-planar shaped sheet of a non-cellular polyurethane elastomer within the interior of the foam or positioning a sheet of non-cellular polyurethane elastomer against a non-planar surface of polyurethane foam. The composite article has an unexpected load-bearing capacity in comparison to the untreated foam. The elastomer sheet should be at least 20 mils thick to provide substantial improvement. It must be non-planar and so positioned that it will be partially compressed when pressure is applied to at least one surface of the article. In practice, this means that the elastomer sheet must be compressed to approach a more planar contour when a load is applied to the article during its use. The resistance of the sheet to this deformation contributes to the enhanced load-bearing capacity of the article.

Composite resilient polyurethane foams having a non-planar sheet of a polyurethane elastomer positioned within their interior can be made many ways. One embodiment is a reversible polyurethane cushion having vertical cavities coated with a polyalkyleneether polyurethane elastomer; for example, a cushion half is prepared having vertical cylindrical cavities extending inwardly from the surface of a flat side; these cored cavities are then coated, by brush or means of a spray, with a fluid polyurethane composition which is subsequently cured to give an elastomer adherently bound to the cushion. These modified cushion halves are then cemented together so that the cavities are located entirely on the inside of the resulting cushion which may be reversed for use. It is not necessary that all the cavities be coated with the polyurethane elastomer; however, the more cavities that are coated, the better the improvement in the load-bearing characteristics of the foam. At least 75% of the surface of the cushion half should be supported by the solid elastomer sub-structure. Only one of the cushion halves need be cored. Alternatively, coring elements made of a polyurethane elastomer may be positioned in the cavities of cored polyurethane foams; these coring elements may be coated with an adhesive if desired; as above, the cushion halves can be subsequently joined together so that the cavities remain entirely within the interior of the article thus produced. The load-bearing characteristics of the composite article obtained can be varied by regulating the thickness of the polyurethane coating; or, the thickness of the polyurethane coring element inserted into said cavity; by the intrinsic stiffness of the polyurethane elastomer, and, by the dimensions of the cavities and their arrangement. When a higher load-bearing is required, the polyurethane elastomer employed should be less flexible; alternatively, a thicker coating of a more flexible polyurethane elastomer may be employed. A balance may be struck between the thickness of the coating and its intrinsic flexibility to obtain the effect desired. When the cavities are coated, each cushion half contains within it, discrete sheets of polyurethane elastomer. If an adhesive is used, part or all of the adhesive used to join the two halves may be a polyurethane elastomer; hence, if desired, some or all of the adherently positioned coring elements may be connected by a sheet of the polyurethane elastomer.

It is desirable that there be no change in the compression characteristics at 25% deflection, but that increased resistance to 50 to 75% deflection is highly desirable.

In some cases, if the entire core is coated, some hardness at the crown of said core may be noted. This hardness results from a thicker coating of elastomer on the crown and may be eliminated by burying the core sufficiently below the surface of the foam so that the foam must be deflected at least 30% before contacting the coated crown or eliminating the hardness by not coating the crown portion but just coating the walls of the core. This may be accomplished by using a rotating spray in-set assembly with center elastomer feed which is thrown out by centrifugal force; the coating thickness and depth of coating may be controlled by rate of sprayer penetration and depth of penetration.

While the preparation of a reversible cushion has been used to illustrate this method, it can be readily applied whenever resilient polyurethane articles are made which contain vertical cavities such as mattresses, bus seats, and the like.

In the above example, the polyurethane sheet was positioned in contact with the non-planar surface of a cavity located wholly within the interior of a cellular polyurethane article. A composite structure can be made without internal cavities and utilize a non-planar sheet of polyurethane elastomer located substantially within its interior by preparing a pair of polyurethane foams, the non-planar contoured surface of one being complementary to a non-planar contoured surface of the other, so that when these surfaces are in juxtaposition, the non-planar surfaces are congruent; an elastomer sheet conforming to the non-planar contoured surfaces is positioned at the interface between the congruent non-planar surfaces; the composite structure obtained thus has a non-planar elastomer sheet inside it. The foams having these non-planar surfaces may be molded or they may be cut from slab stock. A curable fluid elastomer can be applied to one non-planar surface and cured in place before or after juxtaposition of the congruent non-planar surface; a cured elastomer sheet, shaped to conform to the non-planar surface, can be placed thereon before juxtaposition of the complementary surface, the use of an adhesive being discretionary.

The foams having non-planar congruent surfaces may be conveniently prepared by employing a foam slitting device which cuts a slab of polyurethane foam while it is under local deformation; the pieces obtained have contours which correspond to the deformation applied during the slitting operation. The contoured portions obtained from the cutting machine are congruent, that is, the raised portions of one fit exactly into the hollowed portions of the other. The height and pitch of these contours may be regulated by regulating the embossing elements contained on the foam cutting machine. A representative process is described in U.S. Patent 2,835,313.

One or both of the congruent surfaces of the non-planar foams may be covered (by brushing or by spraying or by any conventional application technique known to those in the trade) with a fluid polyisocyanate composition which can subsequently cure to a polyurethane elastomer and join the complementary surfaces to form a composite article. Generally, it is sufficient to apply the fluid polyurethane composition to one surface and then put the complementary surfaces in juxtaposition until an adherent composite article is obtained. The improvement in the compression deflection characteristics of this composite article results from the interposition of the layer of polyurethane elastomer between the congruent surfaces of the halves of polyurethane foam. If the congruent foams are put together without the interposed polyurethane elastomer, the compression deflection characteristics of the foam are the same as the uncut slab stock. It is to be understood that when the elastomer is interposed, variations in the compression deflection characteristics can be achieved by varying the way in which the foam is cut by the slitting device, that is, the pitch of the cut and the depth of the cut. A shallow contour will approach a planar surface, but even here the presence of the interposed elastomer will provide improved load-bearing characteristics.

Although it is preferable that the polyurethane elastomer serve as the adhesive, other adhesives may be used. Thus, a polyurethane elastomeric sheet conforming to the surface configuration of one of the congruent portions of the foam can be adhered to it and then joined to the congruent surface of a second foam. Optionally, the sheet of polyurethane elastomer need not adhere to either portion of the foam but may simply exist in contact with the congruent portions. It is to be understood that the load-bearing capacity of the foam may also be varied by varying the thickness of the polyurethane elastomer; thus portions of the cellular article, where the greatest weight will be placed (such as the shoulder area of a mattress) may receive a thicker coating or a coating of a less flexible elastomer which will provide greater support. It is not necessary that all that entire non-planar surface be covered by a polyurethane elastomer.

Regional variations in the load carrying capacity of the polyurethane article may be obtained by varying the depth of the coating and by varying the nature of the polyurethane elastomer which is applied. It is not necessary that the same composition be used throughout the composite article; a portion of one surface may be treated with one polyurethane composition; a different polyurethane composition may be used for a different portion, and, still another polyurethane composition may be applied to still other portions of the non-planar polyurethane surface or surfaces as is desired.

Another way of making composite resilient polyurethane foams having shaped sheets of a polyurethane elastomer positioned within their interior is to prepare non-planar congruent foam halves followed by truncating the hilltops to give flat peaks, and joining the peaks of the opposing surfaces together. Unlike the above-described composite article made by juxtaposing non-planar congruent surfaces, a composite article containing hollow portions extending throughout the interior of the foam may be utilized. The polyurethane elastomer may be applied to the entire surface of one of the opposing surfaces or both of the surfaces in which case the resulting composite article will have a continuous polyurethane elastomer sheet adherent to and contained within said composite article. Optionally, only one of the opposing surfaces may be coated with a curable polyurethane composition. Alternatively, a portion of one or both of the opposing surfaces may be coated.

Shaped composite resilient cellular polyurethane articles having in juxtaposition on at least one surface thereof a body of non-cellular polyurethane elastomer can be made in many ways. A preferred method is to coat the cavities of a cored polyurethane foam with a fluid polyurethane composition which is curable afterward to a polyurethane elastomer. Articles such as bus seats and automobile seat cushions can be conveniently prepared this way. The compression deflection characteristics of the polyurethane foam obtained will depend upon the arrangement and depth of the cavities, the thickness of the polyurethane coating, and, the nature of the polyurethane coating. Another method is to insert elastomeric polyurethane coring elements into the cored portions of the polyurethane cellular article. These polyurethane coring elements may be separate, or, part or all of them may be connected as members of a polyurethane sheet. Still another way of carrying out this embodiment is to slit polyurethane foam slab stock under local deformation and to coat the non-planar surfaces of the cut polyurethane foam with a fluid polyurethane composition which subsequently is cured to a polyurethane elastomer; the complementary halves are not joined together prior to curing.

It is obvious that many representative articles can be made in a wide variety of shapes and sizes and for many different applications. The polyurethane elastomer contained wholly within the interior of the foam may be a single non-planar sheet which acts as a bond between two foams of equal surface area or it may assume a variety of shapes determined by the non-planar contour of foams which have been joined together. As previously described, the composite structure may include two foams joined together; however, a multiple layer of polyurethane foams may be utilized for special effects.

Molded articles for use in preparing the composite foams of the present invention can be prepared by the techniques common to the trade. Mold cavities may be made from many suitable materials, such as aluminum, steel, reinforced plastic, or any other material which is dimensionally stable during the molding operation. The lid may be made of any material which remains rigid at the processing temperature, such as aluminum or plywood. Coring elements, when used, can be made from, for example, polyethylene.

It is usually desirable to treat the inner surface of the mold with a mold release agent to facilitate the removal of the foam. High-melting waxes have been used. It has been found that certain compounds not only effect release but provide a vastly improved molded product. Normally, a tight skin is formed during molding which prevents the foam from becoming truly porous. When this skin is removed from molded foam, the foam displays decreased pneumaticity, exhibits improved recovery after deformation and an increased rate of cure by moist air. Porous skinned products can be made by trimming slab stock or by abrading molded articles. It is preferable, however, to coat the inner surface of the mold, prior to the introduction of the foamable composition, with compounds such as sulfonated lecithin, oleic acid, lauryl alcohol, dibutyl phenyl phenol disulfonic acid, triethanolamine oleate, potassium oleate, tributyl citrate, cetyl pyridinium chloride, and certain silicones (e.g., Dow Corning's "DC–20" emulsion and "DC–550" fluid; Union Carbide's silicones "X–520" and "Y–1003").

When large molded articles such as a cored mattress are prepared, it is preferred that the foamable composition be introduced into the mold in a series of strips and that coring elements be subsequently positioned in the mold before the composition has expanded enough to contact the positioned coring elements. Instead of using a single lid, it is preferred that lid sections be successively positioned above the strips as fast as they are poured into the mold. A long time is required to fill the mold with the foamable polyurethane composition; by the time the mold is filled, the foam strips first added will have partly expanded; when a conventional single cover plate with its coring elements is then positioned, some of the coring pins will be forced down into the partly expanded foam and will cause localized foam collapse; the molded article will consequently have a mediocre cell structure.

Composite cored upholstered articles suitable for use in preparing the subject articles can be made by a process which comprises placing a fabric into the mold cavity, causing the fabric to conform to the shape of the mold cavity, and pouring a foamable polyurethane composition onto the fabric, with subsequent foaming of the composition to form a resilient cellular material which fills the mold. The composite upholstered article after it has been removed from the mold is comprised of the fabric having the polyurethane foam intimately adhered thereto. This composite upholstered article can be made in any desired shape or form. The fabrics which are useful can be any of the conventional fabrics used in the upholstering or seat cushioning trade such as wool, cotton, regenerated cellulose, silk, linen, leather, nylon, polyacrylic fibers, polyester fibers, and mixtures thereof. The weave of any of these fabrics is not critical; however, when these fabrics are loosely woven, such as in a two-way stretch fabric having many interstices, it is usually desirable to coat the innersurface of the fabric with a flexible impermeable film in order to prevent the foamable polyurethane composition from penetrating through the interstices and appearing on the outside of the upholstered article. Representative materials which may be used to form such a non-permeable film include natural rubber latex, polychloroprene latex, SBR latex, a toluene solution of sulfochlorinated polyethylene and an aqueous solution of carboxymethyl cellulose. When using a latex, it is desirable to treat the same with a thickening agent, such as ammonium caseinate, in order that the latex be sufficiently viscous to adequately fill the interstices and form a film on the innersurface of the fabric. When a film has been applied to the innersurface of the fabric, it must be dried, preferably by the application of heat.

The water-foamable compositions which are preferred for use in the molding process of the present invention comprise isocyanate-terminated polyurethanes which are prepared by agitating a molar excess of an arylene diisocyanate with a polyalkyleneether glycol, a polyalkyleneether thioether glycol, a hydroxyl-terminated polyaliphatic hydrocarbon, a polyester containing a plurality of hydroxyl groups, or a tetrol made by reacting ethylenediamine sequentially with about 44 molar equivalents of 1,2-propylene oxide and about 11 molar equivalents of ethylene oxide. It is to be understood that mixtures of the foregoing polyols may be employed, if desired. For the purpose of this invention it is necessary to use a foamable composition which will yield a resilient cellular article.

The process of this invention may also be carried out by using a mixture of an isocyanate-terminated polyurethane and a polyol of the type listed above. At the time the mold is poured, these components are fed by separate streams to a mixing chamber where they are homogeously dispersed. The relative amounts used are chosen so that enough free isocyanate groups are supplied to react with all the hydroxyl groups and to provide the carbon dioxide needed for expanding the foam. As above, it is preferred to use components which will yield a resilient cellular article.

The useful polyalkyleneether glycols may be represented by the formula $HO(RO)_nH$ where R is an alkylene radical containing up to 10 carbon atoms and $n$ is an integer sufficiently large that the molecular weight of the polyalkyleneether glycol is about 1000–4000. Representative examples of these glycols are poly-1,2-propyleneether glycol (molecular weight 2000), ethylene oxide-modified polypropyleneether glycol (molecular weight 3000), polytetramethyleneether glycol (molecular weight 3000), polypentamethyleneether glycol (molecular weight 4000), and polytetramethylene formal glycol (molecular weight 2000). These polyalkyleneether glycols are made by the polymerization of cyclic ethers such as alkylene oxides or dioxolate or by condensation of the glycols.

Representative of polyalkyleneether-thioether glycols are the following:

$HO(CH_2CH_2-S-CH_2-CH_2-O-CH_2-CH_2-O)_pH$
$HO(CH_2CH_2-S-CH_2CH_2-O-)_pH$
and $HO(CH_2CH_2-S-CH_2CH_2CH_2CH_2-S-CH_2CH_2-O-)_pH$ where $p$ is an integer indicating a molecular weight of 1000–4000. Their preparation is described in French Patent No. 1,128,561.

Typical polyaliphaitc hydrocarbon diols are hydroxyl-terminated polybutadiene (molecular weight 2000). Procedures for making this type of diol are disclosed in French Patent No. 1,139,630.

The polyesters containing plurality of hydroxyl groups which are useful in the present invention should have an acid number less than 2, a hydroxyl number between about 30 and 60, and a water content no greater than 0.05% (by weight). They are made by the polymerization of cyclic lactones such as ε-caprolactone or by the condensation polymerization from a dicarboxylic acid and a molar excess of an organic diol. Optionally, a small amount of a triol (e.g., trimethylolpropane) may be included to provide cross-linking; one molar equivalent for each 3000–12,000 molecular weight of polyester is recommended. Representative examples of useful diols are ethyleneglycol, 1,2-propyleneglycol, 1,3-propanediol, 1,2-butyleneglycol, 1,4-butanediol, thiodiglycol, diethyleneglycol, triethyleneglycol, and 1,2-alkylene oxide-modified glycols such as $H(OCH_2CH_2)_4OCH_2CH_2CH_2CH_2O(CH_2CH_2O)_4H$ and

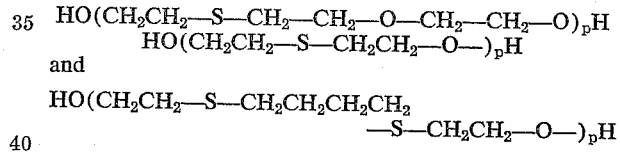

Representative examples of useful polyhydric compounds are glycerol, trimethylolpropane, trimethylolethane, and 1,2-alkylene oxide-modified glycerol, e.g.,

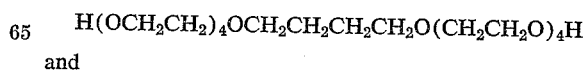
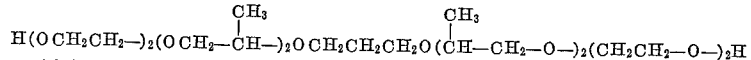
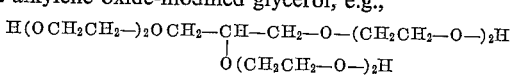

Representative examples of useful dicarboxylic acids are oxalic acid, malonic acid, succinic acid, glutaric acid, adipic acid, pimelic acid, suberic acid, asalaic acid, sebacic acid, fumaric acid, maleic acid, and phthalic acid. Anhydrides of dicarboxylic acids may be employed in place of the acids; succinic anhydride and phthalic anhydride are representative examples.

A wide variety of arylene diisocyanates may be employed in the process, either alone or as isomer mixtures or as mixtures of diisocyanates. Representative compounds include toluene-2,4-diisocyanate,
4-methoxy-1,3-phenylenediisocyanate,
4-chloro-1,3-phenylenediisocyanate,
4-isopropyl-1,3,-phenylenediisocyanate,
4-ethoxy-1,3-phenylenediisocyanate,
2,4'-diisocyanatodiphenylether,
3,3-dimethyl-4,4'-diisocyanatodiphenylmethane, and
1,5-naphthalenediisocyanate.

The preferred diisocyanate is toluene-2,4-diisocyanate. The preferred isomer mixture contains 80% toluene-2,4-diisocyanate and 20% toluene-2,6-diisocyanate. Triisocyanates such as toluene-2,4,6-triisocyanate and 2,4,4'-triisocyanatodiphenylether may be used to provide additional crosslinking.

In general, the isocyanate-terminated polyurethanes are made by agitating the organic polyols and arylene diisocyanates in such proportions that the over-all ratio of the number of free isocyanate groups to the number of hydroxyl groups is greater than 1.0. If desired, the reaction may be carried out in several steps, one or more of which may produce hydroxyl-terminated polyurethanes prior to the final step. The one-step process requires about 1 to 2 hours at 90° C. or about 1.5 to 4 hours at 80° C. or about 4 to 8 hours at 70° C. Optionally, temperatures up to about 150° C. may be employed to introduce additional crosslinking by reactions such as allophanate formation. The progress of the reaction may be followed by determining the free isocyanate content of the mixture. Finally, the polyurethanes obtained are standardized to the desired free isocyanate content (usually 8 to 13% by weight) by addition of more diisocyanate.

When carrying out the process of this invention in the preferred manner, the isocyanate-terminated polyurethane composition is fed to a mixing head along with any desired inert ingredients, such as surfactants, plasticizers, coloring agents, fillers, etc. The water, which is necessary for the foaming reaction, along with a catalyst to accelerate the formation of the cellular article, is fed simultaneously by a separate stream into the mixing head. If an isocyanate-terminated polyurethane composition and a polyol are used, they are fed simultaneously by separate streams into the mixing head; the water and catalyst are usually contained in the polyol stream; the inert ingredients mentioned above may be present in either stream or both; optionally, the water and catalyst may be introduced by one or more streams which enter the mixing head at the same time as the isocyanate-terminated polyurethane stream and the polyol stream. The temperatures at which the streams containing the reactants are fed to the mixing head are not critical; however, in general, temperatures of from about 25 to 50° C. should be used. The ingredients of these streams contact each other in the mixing head which deposits the composition obtained into the mold cavity. After the cover plate has been positioned, the composition expands to fill the mold. The gas needed is produced by the reaction of the water with the free isocyanate groups in the composition. The presence of a catalyst tends to accelerate this reaction. Theoretically, 0.5 mole of water is needed for each mole of free isocyanate groups present in the foamable composition; generally, about 0.5 to 1.5 mole may be supplied, although about 0.6 to 1.0 mole is preferable. It is to be understood that "free" isocyanate groups means those isocyanate groups which are available to react with water. For example, when a glycol is present during the foaming reaction, its hydroxyl groups will react with isocyanate groups to form urethanes; the number of moles of alcoholic and carboxylic hydroxyl groups present in the foamable composition is subtracted from the total number of moles of isocyanate groups also present to get the number of moles of "free" isocyanate groups.

Any of the basic catalysts familiar to those skilled in the art of polyurethane foam technology may be used in the subject process provided that the concentration of the catalyst and its catalytic activity are so balanced that sufficient time is provided for mixing the foamable composition, introducing it into the mold, and positioning the cover-plate without contacting the foaming polyurethane composition contained therein. N-methylmorpholine is a preferred catalyst which may be used alone or mixed with volatile trialkylamines such as triethylamine. Odorless catalysts such as 3-diethylaminopropionamide and heat-activated catalysts such as triethylamine citrate, 3-N-methylmorpholinepropionamide and 2-diethylaminoacetamide are employed advantageously. The mold must be heated to about 70° C. after loading, if the heat-activated compounds are used, to complete the foaming in a convenient period of time.

The polyurethane elastomers used in making the composite cellular articles of this invention are prepared by chain-extending the isocyanate-terminated fluid polyurethane polymers described above. An arylene diamine is incorporated in the fluid polymer composition before it is applied to the surface of the foam. Representative examples of these arylene diamines include 4,4'-methylene-bis-(2-chloroaniline), 4,4'-methylene-bis(3-methyl aniline), 4,4'-methylene-bis(3-methoxy aniline), mesitylene diamine, 1,5-naphthylene diamine, meta-phenylene diamine, and mixtures thereof. Approximately a half mole of arylene diamine is used for every mole of free isocyanate groups. Chain extension may also be carried out by introducing low molecular weight aliphatic polyols such as 1,2,6-hexenetriol, trimethylol propane, trimethylol ethane, ethylene oxide modified glycerol, ethylene oxide modified hexane triol, and mixtures thereof. Sufficient polyol is used to provide about one hydroxyl group for every free isocyanate group present in the fluid composition. In order to facilitate chain extension with aliphatic polyols, catalysts for urethane formation such as ferric acetyl acetonate can be introduced into the composition. Ferric acetyl acetonate is preferred since it is highly effective; it is a non-hygroscopic solid, and it is readily miscible with glycol reactants. The amount of catalyst in the glycol-catalyst mixture may range from about 0.01% to 0.10% by weight, based on the combined weight of the glycols. It is advantageous to use an aliphatic tertiary amine as co-catalyst with the ferric acetyl acetonate; about 0.025 to 0.05% ferric acetyl acetonate and 0.5 to 1% of diethylaminopropionamide can be used. The coated foam should be thereafter placed in a heated zone maintained at a temperature of 100 to 150° C. for a residence time of about ten to sixty minutes. It is to be understood that this residence time depends inversely on the temperature of the zone, the concentration and the activity of any catalysts present, and, the reactivity of the chain-extending agents and of the aromatic diisocyanate used. The time needed may range from about 10 to 60 minutes.

When the fluid curable polyurethane elastomer composition is too viscous for ready handling, it may be applied in solution. Any solvent may be employed provided that it is inert to the isocyanate groups under the conditions of the application; thus, the solvent should be free from active hydrogen atoms; that is, it should not have groups containing hydrogen atoms which are reactable according to the Zerewitinoff test. Representative examples of useful solvents are mixed xylenes and toluene.

In the accompanying drawing, FIGURES 1, 2, 3 and 4 represent varied embodiments of the present invention. FIGURE 1 is a perspective view of a cut slab of polyurethane foam having numerous cavities formed in the top side of said slab, said cavities and top side being lined with an elastomer layer at least 20 mils in thickness. A sectional view of FIGURE 1, FIGURE 2, discloses the depth of cavity penetration and the elastomer lining within said foam cavities.

Figure 3:
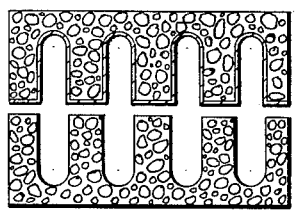
Figure 4:
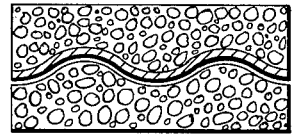

The present invention may utilize many shapes of foam together with varied non-planar foam surfaces; and, portions of different elastomers, or a single elastomer in a non-planar layer, depending on the particular properties desired at a particular point in the foam slab. FIGURE 3 represents a cored foam slab as disclosed in FIGURE 1 positioned over a similar cored foam slab without a non-planar elastomer layer. FIGURE 4 sets forth another embodiment wherein a single non-planar elastomer layer is positioned between the non-planar but congruent surfaces of two slabs of foam.

Representative examples illustrating the present invention are as follows:

EXAMPLE 1

Part A

PREPARATION OF POLYURETHANE POLYMER A 100 parts of polypropyleneether glycol of about 2025 molecular weight, 0.56 part of polydimethylsiloxane (50 centistokes grade) and 0.3 part of water are stirred together for 15 minutes at room temperature. Then 14.3 parts of 80:20 mixture of toluene-2,4- and toluene-2,6-diisocyanate is introduced with stirring. Heat is evolved. After about 25 minutes the temperature of the mass begins to drop. External heat is then applied. The temperature is raised to 140° C. over a 50-minute period. The mass is agitated at 140° C. for 18 minutes and then cooled to 38° C. over a one-hour period. 27 additional parts of the toluenediisocyanate isomer mixture is introduced. The polyisocyanate composition thus obtained has a free isocyanate content of about 9.6% and exhibits a Brookfield viscosity of 21,000 cps. at 30° C.

PREPARATION OF POLYURETHANE POLYMER B 278.7 parts of toluene-2,4-diisocyanate and 1000 parts of anhydrous polytetramethyleneether glycol (molecular weight 1000) are agitated at 80° C. for 4 hours in a dry reaction vessel protected from atmospheric moisture. Polyurethane polymer B thus obtained has a free isocyanate content of 4.2%, a Brookfield viscosity at 30° C. of about 16,500 cps., and a number-average molecular weight of about 2000.

PREPARATION OF POLYURETHANE POLYMER C 348.4 parts of toluene-2,4-diisocyanate and 1000 parts of anhydrous polytetramethyleneether glycol (molecular weight 1000) are agitated at 80° C. for 4 hours in a dry reaction vessel protected from atmospheric moisture. Polyurethane polymer C thus obtained has a free isocyanate content of 6.4% and a Brookfield viscosity at 30° C. of 6000 to 7000 cps.

Part B

MOLD DESCRIPTION

A cast aluminum mold is employed having a volume of 0.54 cu. ft. The bowl is 20 inches long, 20 inches wide, and 3 inches deep at the crown. Projecting from the lower side of the cover plate are 81 tapered pins 1¼ inches in diameter and arranged 1¼ inches apart in rows of 9. Gas is vented by grooves located midway between each row of pins and extending to the edge of the cover plate.

Part C

PREPARATION OF MASTERBATCH 1-C

A masterbatch is prepared by mixing 37,324 parts of polyurethane polymer A, 187 parts of polydimethylsiloxane (50 centistokes grade), and 1,866 parts of di(2-ethylhexyl)phthalate at about 40° C.

Part D

PREPARATION OF THE CATALYST SOLUTION 1-D

A catalyst solution is prepared by mixing 3,732 parts of N-methylmorpholine, 1,244 parts of triethylamine, and 9,106 parts of water at room temperature.

Part E

PREPARATION OF THE MOLDED RESILIENT CORED FOAM

The inner surface of the mold and the underside of the cover plate are coated with a high-melting hydrocarbon wax which acts as a mold release agent. The apparatus is then heated to about 43° C.

Masterbatch 1-C at about 40° C. and catalyst solution 1-D at room temperature are separately pumped at rates of about 2800 parts per minute and 100 parts per minute, respectively, to an intermittent mixing head of the type described in U.S. Patent 2,868,518. The streams enter separate ports of a rotary valve plug and pass into a "basket" mixer where they are intimately dispersed by an agitator revolving 4000 times a minute. The foamable composition obtained is immediately discharged from the mixing chamber into the mold. Every 100 parts of polyurethane polymer A in this mixture is accompanied by 0.5 part of polydimethylsiloxane (50 centistokes), 5 parts of di(2-ethylhexyl)phthalate, 1 part of N-methylmorpholine, 0.3 part of triethylamine, and 2.44 parts of water (120% of theory). After about 16 seconds (when about 738.5 parts of the masterbatch and 26.2 parts of catalyst solution have been blended and discharged), the plug valve of the mixing head is turned to the alternative position to stop the mixing of the masterbatch and catalyst solutions and the subsequent discharge of the foamable composition. The cover plate is promptly seated on the mold. The mixture contained therein expands to fill the mold with a porous gel which becomes a resilient tack-free polyurethane foam having a density of about 2.4 lb./cu. ft. About 15 minutes after the mold has been loaded, the cover plate is removed and the foam is stripped from the mold. This foam is passed through compression rolls to break the closed cells present and is finally cured at 120° C. for 3 hours.

Part F

PREPARATION OF A REINFORCED FOAM USING AN ELASTOMER MADE FROM POLYURETHANE POLYMER B 100 parts of polyurethane polymer B and 13 parts of 4,4'-methylene-bis(2-chloroaniline) are stirred together at room temperature. A layer about 1/16 inch of the fluid composition obtained is applied by a brush to the surface of each cored cavity of the molded foam prepared in part E above. The coated foam is then heated at 120° C. for 60 minutes. The fluid composition applied is thereby cured to a polyurethane elastomer which adheres to the surface of the foam giving a laminated article. The compression deflection data are given in Table I-F below.

TABLE I-F

| Percent Deflection | Compression (lbs./50 sq. in.) | |
|---|---|---|
| | Foam with Coated Cavities | Control Foam Uncoated |
| 25 | 19 | 17 |
| 50 | 42 | 34 |
| 75 | 125 | 84 |

Part G

PREPARATION OF THE REINFORCED FOAM USING AN ELASTOMER MADE FROM POLYURETHANE POLYMER C

A polyisocyanate solution is prepared by mixing 2450 parts of a 70% solution of polyurethane polymer C in methyl ethyl ketone with 1050 parts of methyl ethyl ketone. An amine solution is prepared by mixing 225 parts of 4,4'-methylene-bis(aniline), 800 parts of ethyl acetate, 400 parts of methylene chloride, and 150 parts of cellulose acetate. These solutions are simultaneously sprayed onto the surface of each cored cavity of the foam prepared in part E above. A two-component air gun operating at a pressure of 40 lbs./sq. in. (guage) is used. A single coating 10 to 15 mils in thickness is applied and subsequently air-dried for 10 minutes. This operation is repeated until a coating about 50 mils thick has been built up. The coated foam is then heated for 45 minutes at 120° C. The fluid composition applied is thus cured to a polyurethane elastomer which adheres to the surface of the foam giving a laminated article. The compression deflection data are given in Table I–G which follows:

TABLE I-G

| Percent Deflection | Compression (lbs./50 sq. in.) | |
|---|---|---|
| | Foam with Coated Cavities | Control |
| 25 | 26 | 17 |
| 50 | 60 | 34 |
| 75 | 151 | 84 |

Part H

A coating about ⅛ inch thick of a mixture of 100 parts of polyurethane polymer B and 13 parts of 4,4'-methylene-bis(2-chloroaniline) is applied to the underside of the cover plate (coated with a high melting hydrocarbon wax) used in part E. The coated cover plate is heated for 2 hours at 120° C. The coating is thereby converted to a tough elastomer which is stripped from the mold. The elastomeric coring elements projecting from the sheet are inserted into the cored cavities of the uncoated resilient polyurethane foam (1–E). The load-carrying capacity of the foam is thereby greatly improved. The compression deflection data are given in Table I–H which follows:

TABLE I-H

| Percent Deflection | Compression (lbs./50 sq. in.) | |
|---|---|---|
| | Reinforced Foam | Control |
| 25 | 32 | 16 |
| 50 | 95 | 35 |
| 75 | 305 | 82 |

EXAMPLE 2

Part A

PREPARATION OF SLAB MOLDED RESILIENT POLYURETHANE FOAM

The procedure of part E of Example 1 is repeated except that a slab mold 79 inches long, 42 inches wide, and 5 inches high is substituted for the core mold described therein.

Part B

PREPARATION OF COMPLEMENTARY CONTOURED FOAMS

The slab molded resilient polyurethane foam prepared in part A above is fed between the nip of a pair of rollers having raised embossing elements where it contacts a cutting blade while compressed (a representative machine is the Bandknife Profile-Cutting Machine No. 69KP available from the Fecken-Kirfel Maschinenfabrik of Aachen, Germany). The opposing faces of the foams which emerge are contoured to give straight rows and columns of cone-shaped adjustment hills, which hills are each 3 inches high and 57° at the base.

Part C

PREPARATION OF LAMINATED ARTICLES 100 parts of polyurethane polymer B (see Example 1) and 13 parts of 4,4'-methylene-bis(2-chloroaniline) are stirred together at room temperature to give a curable fluid polyurethane composition. A coating is brushed onto the contoured surface of one of the complementary pairs of contoured foam made above. The uncoated complementary surface of the other foam is placed against this coated surface to give a composite structure (2A). Three additional (2B, 2C, 2D) composite structures are made in a similar manner by placing the uncoated contoured surface of a foam each time against the complementary coated surface of a second foam, the coating being thicker in 2B than in 2A, in 2C than in 2B, in 2D than 2C. The composite structures (2A–2D) are heated for 2 hours at 120° C. to give laminated articles (2A–2D) each having a contoured sheet of polyurethane elastomer adherently positioned between two resilient polyurethane foams. The compression-deflection characteristics of these laminated articles are given in Table 2 below.

TABLE 2

| Foam | Parts Elastomer per 100 Parts of Foam | Composite Article Elastomer Present Compression (lbs./50 sq. in.) to— | | |
|---|---|---|---|---|
| | | 25% | 50% | 75% |
| 2A | 12 | 18 | 30 | 69 |
| 2B | 19 | 19 | 36 | 81 |
| 2C | 28 | 21 | 42 | 89 |
| 2D | 41 | 23 | 51 | 110 |
| Uncut | | 17 | 28 | 60 |

EXAMPLE 3

Part A

PREPARATION OF COMPLEMENTARY CONTOURED FOAMS

The contoured resilient polyurethane foam is prepared according to the procedure of parts A and B of Example 2 above.

Part B

PREPARATION OF LAMINATED ARTICLES

A coating approximately ¹⁄₁₆ inch thick of one of the following curable fluid polyurethane compositions (3A–3C) is applied to one opposing face of each of three complementary pairs of contoured foam: These compositions are a mixture of 100 parts of polyurethane polymer B and 11 parts (3A), 13 parts (3B), and 20 parts (3C), respectively, of 4,4'-methylene-bis(2-chloroaniline). The uncoated complementary surfaces are then placed against the coated surfaces. The composite structures obtained are heated for 2 hours at 120° C. to give laminated articles each having a contoured sheet of polyurethane elastomer adherently positioned between two resilient polyurethane foams. The compression-deflection characteristics of these laminated articles are given in Table 3 below.

The curable fluid polyurethane compositions (3A–3C) are cast in molds and heated for 2 hours at 120° C. to give slabs of polyurethane elastomer (3A–3C). Their moduli are given in Table 3 below.

TABLE 3

| Foam | $M_{300}$ (lb./sq. in.) of Elastomer[1] Introduced | Elastomer Present Compression (lb./50 sq. in.) to — | | |
|---|---|---|---|---|
| | | 25% | 50% | 75% |
| Uncut | | 17 | 28 | 56 |
| 3A | 1,100 | 17 | 33 | 75 |
| 3B | 1,975 | 19 | 37 | 80 |
| 3C | 3,200 | 20 | 43 | 105 |

[1] 22 parts elastomer/100 parts of foam.

These data demonstrate how the resistance to compression at 50 and 75% deflection is increased while the resistance at 25% deflection remains essentially constant by incorporating polyurethane elastomers of different moduli.

EXAMPLE 4

Part A

PREPARATION OF COMPLEMENTARY CONTOURED FOAMS

The slab molded resilient polyurethane foam prepared in Part A of Example 2 above is fed between the nip of a pair of rollers having raised embossing elements where it contacts a cutting blade while compressed (a representative machine is the Bandknife Profile-Cutting Machine No. 69KP available from the Fecken-Kirfel Maschinen Fabrik of Aachen, Germany). The opposing faces of the foams which emerge are contoured in a complementary manner to give straight rows and columns of adjacent cone-shaped hills. Three sets of complementary foams ($4A_1$, $4A_2$; $4B_1$, $4B_2$; $4C_1$, $4C_2$) are prepared:

| Foam Pair | Hill Height (inches) | (Degrees) Angle at Base of Hill |
|---|---|---|
| $4A_1$, $4A_2$ | 2¼ | 49 |
| $4B_1$, $4B_2$ | 3 | 57 |
| $4C_1$, $4C_2$ | 4 | 64 |

Part B

PREPARATION OF LAMINATED ARTICLES

A coating of about 1/16 inch thick of a mixture of 100 parts of polyurethane polymer B (see Example 1) and 13 parts of 4,4'-methylene-bis(2-chloroaniline) is applied between the complementary surfaces of foams $4A_1$ and $4A_2$, foams $4B_1$ and $4B_2$, and foams $4C_1$ and $4C_2$. The composite structures (4A, 4B, 4C) are heated at 120° C. for 2 hours to give laminated articles (4A–4C) each having a contoured sheet of polyurethane elastomer adherently positioned between two resilient polyurethane foams. The compression-deflection characteristics of these laminated articles are given in Table 4 below.

TABLE 4

| Percent Deflection | Compression (lb./50 sq. in.) | | | | Parts Elastomer per 100 Parts of Foam |
|---|---|---|---|---|---|
| | Uncut Foam | Composite Structures | | | |
| | | 4A | 4B | 4C | |
| 25 | 16 | 20 | 20 | 22 | 17 |
| 50 | 27 | 31 | 35 | 38 | 15 |
| 75 | 57 | 70 | 78 | 88 | 16 |

EXAMPLE 5

Part A

PREPARATION OF POLYURETHANE POLYMER 5A

The entire process is carried out under nitrogen with continuous agitation.

100 parts of polypropyleneether glycol (average molecular weight 2000) is stirred with 0.15 part of water for 30 minutes at 35–40° C. 9.85 parts of a toluenediisocyanate isomer mixture (80% 2,4-, 20% 2,6-, molar ratios NCO/OH=1.05/1; NCO/H$_2$O=1/1) is introduced over a 30-minute period. External heat is applied to raise the temperature of the mass to 120° C. over a 45-minute period. The reactants are kept at 120° C. for 2 hours. About 26.6 parts of the toluenediisocyanate isomer mixture is introduced to raise the free isocyanate content of the mass to 9.5%. The reaction is continued for one more hour at 120° C. External cooling is then applied to lower the temperature to 40° C. at the rate of a half degree a minute. Polyurethane polymer 5A thus obtained has a Brookfield viscosity at 30° C. of 6,500 cps. and a 9.5% free isocyanate content.

Part B

PREPARATION OF POLYURETHANE POLYMER 5B

The entire process is carried out under nitrogen with continuous agitation.

100 parts of polypropyleneether glycol (average molecular weight 2000) is stirred with 0.4 part of water for 15 minutes at 35–40° C. 10.4 parts of a toluene diisocyanate isomer mixture (80% 2,4-; 20% 2,6-; molar ratio NCO:OH=1.45:1) is introduced. After 30 minutes external heat is applied; over a 45-minute period the temperature of the mixture is raised to 120° C. The reactants are agitated at 120° C. for 90 minutes. Then external cooling is applied and the temperature is lowered to 50° C. over a 45-minute period. Then additional toluene diisocyanate isomer mixture is introduced. Polyurethane polymer 5B, as obtained, has a free isocyanate content of 10.51% and exhibits a Brookfield viscosity of 29,000 cps. at 30° C.

Part C

PREPARATION OF RESILIENT POLYURETHANE MATTRESS 100 parts of polyurethane poylmer 5A and 50 parts of polyurethane polymer 5B are stirred together. The following compounds are then added with agitation: 1 part of a silicone emulsion (commercially available from Dow Corning as "DC–EF 4527"), 2 parts of a liquid polymer (commercially available from Wyandotte Chemicals as "Pluronic" L35) having a molecular weight of about 1600–2000 and made by reacting a polypropyleneether glycol of molecular weight about 800–1000 with ethylene oxide, 1 part of N-methyl morpholine, 0.3 part of triethylamine, and 2.2 parts of water. The foamable composition obtained is poured into a mold 79 inches long, 42 inches wide, and 5 inches wide whose inner surface has been treated with a high melting hydrocarbon wax. The foamable composition expands to fill the mold. After the foam has become tack-free, it is stripped from the mold and cured at 120° C. for 3 hours. The resilient polyurethane slab mattress thus prepared has a density of 2.6 lbs./cu. ft.

Part D

PREPARATION OF REINFORCED RESILIENT POLYURETHANE MATTRESS

The resilient polyurethane slab mattress made in part C above is slit into contoured halves by the procedure of part B of Example 2 above. A polyurethane elastomer sheet is adherently positioned between the complementary contoured surfaces by the procedure of part C of Example 2 above. The composite structure obtained is very useful as a mattress because of its excellent load-bearing capacity.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A resilient cellular polyurethane structure having incorporated therewith an elastomeric solid non-cellular polyurethane non-planar sub-structure essentially co-extensive with at least 75% of one surface of said cellular polyurethane structure, said non-cellular polyurethane sub-structure being at least 20 mils thick and said non-cellular polyurethane sub-structure being positioned so that it will be partially compressed when surface pressure is applied to said structure.

2. A resilient polyurethane structure according to claim 1, said structure having regions of varied increased load-bearing capacity.

References Cited in the file of this patent

UNITED STATES PATENTS

| | | |
|---|---|---|
| 1,805,038 | Derr | May 12, 1931 |
| 2,271,058 | Binns | Jan. 27, 1942 |
| 2,469,084 | Schenker | May 3, 1949 |
| 2,576,073 | Kropa et al. | Nov. 20, 1951 |
| 2,763,013 | Van Valkenburgh | Sept. 18, 1956 |
| 2,845,997 | Waite | Aug. 5, 1958 |
| 2,858,296 | Stilmar | Oct. 28, 1958 |
| 2,878,153 | Hackländer | Mar. 17, 1959 |
| 2,927,876 | Hoppe et al. | Mar. 8, 1960 |
| 2,994,890 | Wagner | Aug. 8, 1961 |

FOREIGN PATENTS

| | | |
|---|---|---|
| 723,621 | Great Britain | Feb. 9, 1955 |
| 810,095 | Great Britain | Mar. 11, 1959 |
| 634,414 | France | Nov. 17, 1927 |
| 1,068,779 | France | Feb. 10, 1954 |
| 1,162,788 | France | Apr. 14, 1958 |
| 542,861 | Italy | Oct. 1957 |